(12) United States Patent
Viken (10) Patent No.: US 6,267,160 B1
(45) Date of Patent: Jul. 31, 2001

(54) FLOW ALIGNMENT STRUCTURE FOR FLUID EXCHANGE APPARATUS

(76) Inventor: James P. Viken, 9907 Valley View Rd., Eden Prairie, MN (US) 55344-3526

( * ) Notice: Subject to any disclaimer, the term of this patent is extended or adjusted under 35 U.S.C. 154(b) by 0 days.

(21) Appl. No.: 09/404,485

(22) Filed: Sep. 23, 1999

Related U.S. Application Data (63) Continuation-in-part of application No. 09/235,560, filed on Jan. 22, 1999, now Pat. No. 6,082,416.
(60) Provisional application No. 60/100,895, filed on Sep. 23, 1998.

(51) Int. Cl.[7] .................................................. F16C 3/14
(52) U.S. Cl. .............................. 141/98; 141/65; 184/1.5
(58) Field of Search .................. 141/65, 95, 98; 184/1.5; 137/87.01, 115.13, 115.16, 118.06, 119.02, 119.08, 205.5

(56) References Cited

U.S. PATENT DOCUMENTS

| | | | |
|---|---|---|---|
| 3,073,332 | * 1/1963 | Strader | 137/112 |
| 4,635,671 | * 1/1987 | Viegas | 137/102 |
| 5,318,080 | * 6/1994 | Viken | 141/98 |
| 5,472,064 | * 12/1995 | Viken | 184/1.5 |
| 5,806,629 | 8/1998 | Dixon . | |
| 6,062,275 | 5/2000 | Rome . | |
| 6,065,567 | 5/2000 | Comacho . | |
| 6,082,416 | * 7/2000 | Viken | 141/98 |

* cited by examiner

Primary Examiner—Gregory L. Huson
Assistant Examiner—Peter deVore
(74) Attorney, Agent, or Firm—John F. Klos; Larkin, Hoffman, Daly & Lindgren, Ltd.

(57) ABSTRACT

A system and method for exchanging used hydraulic fluid with fresh hydraulic fluid in an accessed hydraulic fluid system. The system including a fluid exchange assembly having a fluid receptacle and an interior fluid separation member, which may be a distendable diaphragm member. The exchange system further includes features of automatic fluid flow alignment, an exchange mode indicating system, and a bypass system for removing at least a portion of the exchange system during a bypass mode of operation. The invention particularly relates to an automatic flow alignment structure for use in association with a fluid exchange apparatus for extracting and exchanging used hydraulic fluid with fresh fluid.

20 Claims, 5 Drawing Sheets

FLOW ALIGNMENT STRUCTURE FOR FLUID EXCHANGE APPARATUS

RELATED APPLICATIONS

This application claims the benefit of priority pursuant to 35 USC §119(e)(1) from the provisional patent applications filed pursuant to 35 USC §111(b): as Ser. No. 60/100,895 on Sep. 23, 1998.

This application is a continuation-in-part of application Ser. No. 09/235,560 filed Jan. 22, 1999 now U.S. Pat. No. 6,082,416.

BACKGROUND OF THE INVENTION

1. Field of the Invention

The present invention relates to hydraulic fluid exchanging devices, and more particularly to an apparatus for achieving a proper flow alignment condition between the fluid exchange device and an automotive automatic transmission.

2. Description of the Prior Art

The market environment for automatic transmission fluid exchange systems has undergone relatively rapid recent expansion. Many such devices have been developed for such use. One unresolved problem has been the inherent need for an inexpensive fluid exchanger which is simple to operate and which supports desirable features of some known, more complex and expensive exchange units, such as the bypass circuits and flow alignment mechanisms as disclosed in U.S. Pat. No. 5,472,064 to Viken. In particular, Viken '064 discloses a flow alignment device for aligning the flow of fluid within the exchange device with the fluid flowing in the accessed transmission circuit. Additional desirable features include an indicating system to notify the operator of the device's different modes of operation. These modes may include a fresh fluid filling mode, a fresh fluid completion mode, a fluid exchange mode, and a fluid exchange completion mode of operation. Another limitation has been time consuming fluid exchanges for vehicles with low flow rate transmissions. Some transmissions provide slow flow rate under certain conditions (such as cold ATF fluid) which limits the operability of the displacement type fluid exchangers.

SUMMARY OF THE INVENTION

Addressing the deficiencies of the conventional art, the instant invention resolves the problems in an efficient, and cost effective manner. The present invention relates to a simple, easy to operate, inexpensive fluid exchanger for automatic transmissions or hydraulic circulating systems and the like of vehicles, machinery, aircraft and equipment. The fluid exchange system includes numerous desirable features, including a flow alignment device, a bypass device for removing a portion of the exchange device from the fluid exchange process, and proximity sensors which detect the presence of or absence of a retained separation member of the exchange device. The proximity sensors relay information that the fluid receptacle is either full of fresh fluid or spent fluid. Additionally, a proximity operated bypass valve assembly is used to automatically transfer the mode of operation from fluid exchanging to a bypass mode wherein the incoming spent fluid conduit is coupled to the outgoing fresh fluid supply conduit. The fluid bypass circuit protects the transmission from disruption of fluid circulation in its cooling circuit when the fresh fluid supply of the unit is depleted. An optional external pump pack can be used to fill a portion of the device and/or empty the device. The optional external pump pack can also be used to provide boost to the incoming spent fluid conduit to speed up the fluid exchange by augmenting the flow through the invention if a very low flow automatic transmission is being serviced.

The proximity indicating system is implemented to notify the operator by light and tone when the device is depleted of its fresh fluid supply and has entered the bypass mode of operation. Similarly, the proximity indicating system may indicate, during filling of fresh fluid, that the fresh fluid portion of the receptacle is filled with fresh fluid while the spent fluid portion is depleted. For enhanced portability, the LEDs and associated indicating circuitry may be battery operated.

Additionally, the instant invention provides effective, inexpensive means to obtain fluid flow alignment between the device and the hydraulic fluid circulation system. A low resistance combination flow meter/sightglass is utilized to provide the operator with an indicator of proper fluid flow through the system in the exchange mode and the subsequently utilized bypass mode.

A further feature of the present invention is the optional pump pack which provides a safe and rapid means of recharging the unit for a subsequent fluid exchange without using a forced-feed bulk fluid supply system. Connection may be made with a suitable quick connect coupling between a fresh fluid supply port and the bulk fluid supply. The optional pump pack may also be used to provide boost of the fluid flow otherwise provided solely by the internal pump of the transmission being serviced. Boost power can be especially useful for some low flow or low pressure situations.

The present invention may be used in conjunction with or in relation to inventions disclosed in the following U.S. patent applications of the applicant:

Dual Chamber Fluid Exchange Apparatus, Ser. No. 09/235,562, filed Jan. 22, 1999;

Self Regulating Valve for a Fluid Exchange Apparatus, Ser. No. 09/235,561, filed Jan. 22, 1999; and Auto Loading Fluid Exchanger and Method of Use, Ser. No. 09/301,851, filed Apr. 29, 1999.

All documents within these applications are herein incorporated by reference in their entireties for all purposes.

The above and other objects, features, and advantages of the present invention are further disclosed in the following detailed description in conjunction with the drawings.

DESCRIPTION OF PREFERRED EMBODIMENTS

Figure 1:
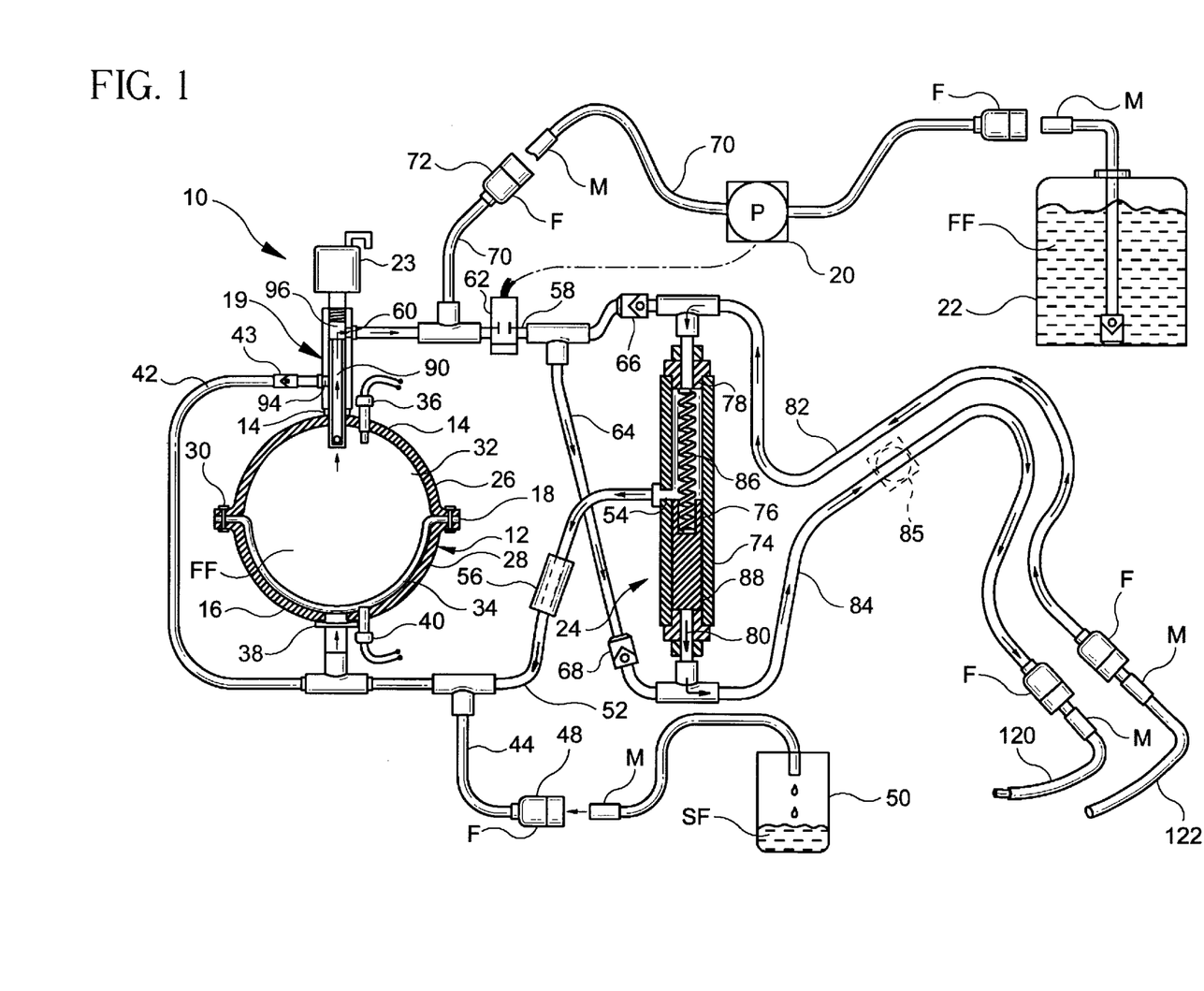
FIG. 1 is schematic view of a fluid exchange system according to the present invention illustrating a fill fresh fluid portion of the fluid receptacle and operating in an initial fluid exchange mode of operation.
Figure 2:
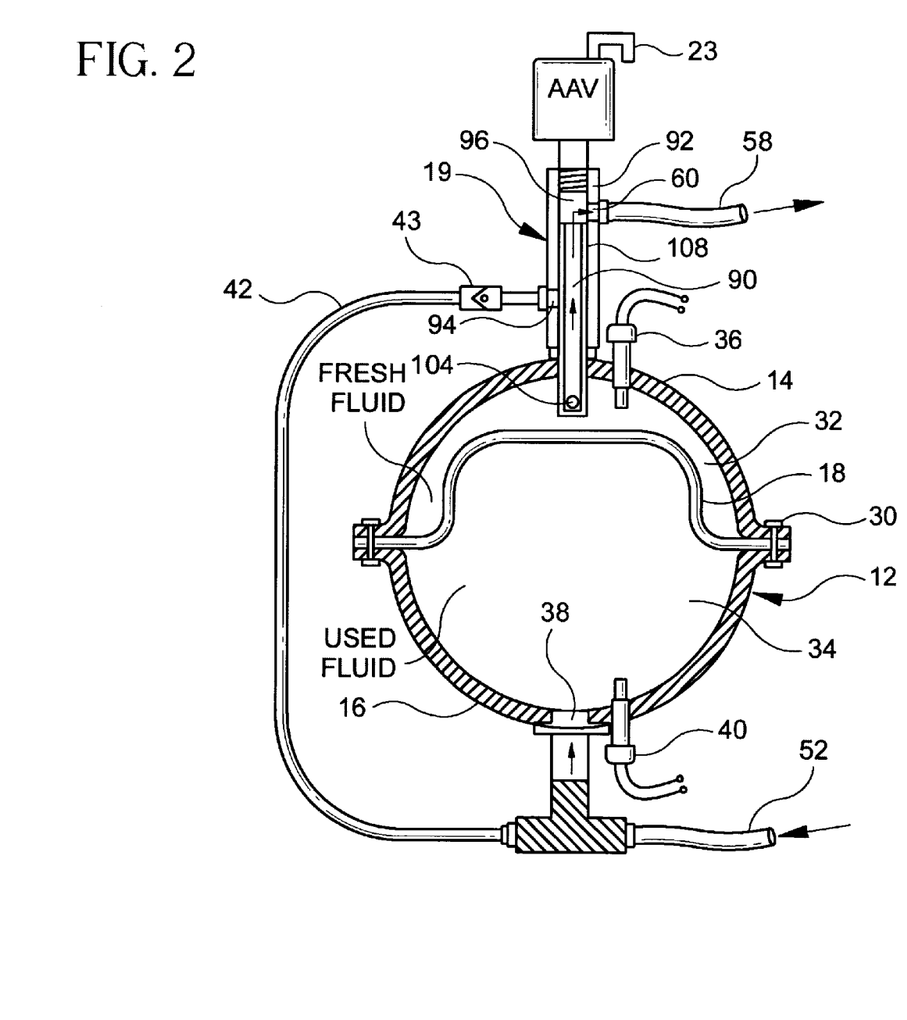
FIG. 2 is schematic view of a portion of the fluid exchange system of FIG. 1 operating in an fluid exchange operation.
Figure 3:
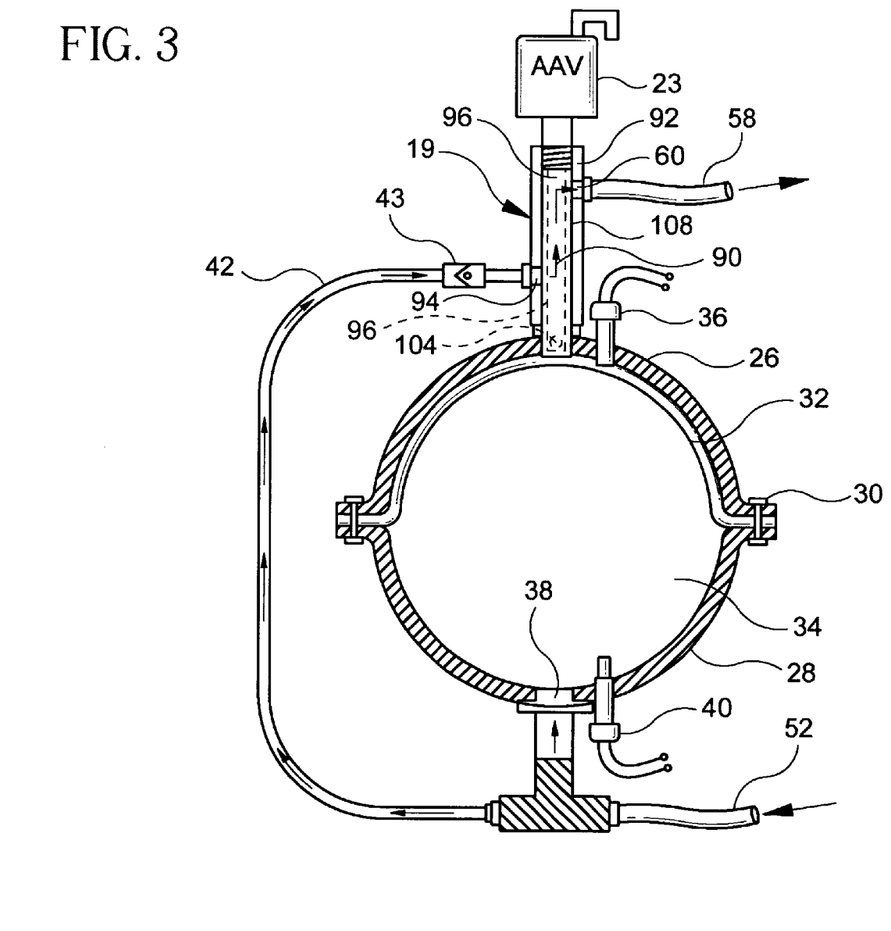
FIG. 3 is a schematic view of a portion of the fluid exchange system of FIG. 1 operating in a bypass mode of operation.

Referring now to the drawings, where like numerals represent like parts throughout, FIGS. 1–3 are a schematic views of fluid exchange system 10 according to the present invention. FIG. 1 represent the exchange system 10 in an initial exchanging mode of operation. FIG. 2 represent the exchange system 10 also in the exchanging mode of operation, though after a passage of a period of time. Finally, FIG. 3 illustrates the exchange system 10 in the bypass mode of operation. The exchange system 10 includes a fluid receptacle 12 having a first end 14 and a second end 16 and an intermediate separation member 18, which though illustrated herein is a flexible diaphragm member, may be a piston or similar movable structure. The exchange system 10 further includes a bypass assembly 19, an auxiliary pump 20, a remote source of fresh hydraulic fluid 22, and a flow alignment device 24 for aligning the flow of fluid within the exchange system 10 with that established within the transmission circuit (not shown). An automatic air release valve 23 may be coupled to the fluid exchange apparatus 10 to remove accumulated entrained air of the fluid. It may be appreciated by those skilled in the art that the exchange system 10 of the present invention, while described herein in a preferred application for use with automotive automatic transmission, may be suitable for fluid exchange purposes for a variety of hydraulic systems, such as vehicles, airplanes, tractors, stationary hydraulic systems, etc.

A receptacle assembly 12 includes a pair of tank halves 26, 28 which maintain a flexible rubber diaphragm 18. Tank half 26 and tank half 28 are secured by fasteners 30 distributed around the circumferential lip of each tank half 26, 28. Tank halves 26 and 28 are of spun steel, but may also be constructed of deep drawn steel or alternative metals. Tank halves 26 and 28 may also be constructed of molded plastic compounds which are resistant to the effects of ATF. Other alternative means to secure a Diaphragm 18 inside a middle circumference of a molded or welded tank assembly 12 without combining to tank halves 26, 28 are well known in the hydraulic art. Such as, but not limited to compression rings forced against a middle circumferential protrusion, etc. Diaphragm 18 is molded of an Automatic Transmission Fluid (ATF) resistant material such as Buna-N (Nitrile), Viton®, or any material which is significantly resistant to mineral based oils or the particular fluid being exchanged. Diaphragm 18 is deformable to distend to occupy either side of tank 26, 28 assembly 12 without providing significant resistance which would interfere with the inflow of spent or fresh fluid into the tank 12.

Still referring to FIG. 1, the receptacle 12 includes a fresh fluid portion 32 and a used fluid portion 34 defined by the relative position of the diaphragm 18. The fresh fluid portion 32 of FIG. 1 includes substantially the entire inner volume of the receptacle 12. The fresh fluid portion 32 is fluidly coupled to a portion of the bypass control assembly 19 and to a proximity sensor 36. The used fluid portion 34 is fluidly coupled to a used fluid inlet port 38 and a proximity sensor 40. A bypass conduit 42 is coupled between the used fluid inlet port 38 and the bypass control assembly 19. Bypass conduit 42 includes a check valve 43 which fluid flow in a reverse direction, especially during the fresh fluid filling procedure. The used fluid inlet port 38 is further coupled to a used fluid expulsion conduit 44 having a quick coupling connector 46. Used fluid expulsion conduit 44 may be connected to deliver used fluid to a used fluid receptacle 50. Used fluid inlet port 38 is fluidly coupled via conduit 52 to a central outlet port 54 of the flow alignment structure 24. Conduit 52 includes a sight gage 56 which may provide flow rate information. If sightglass/flowmeter 56 shows minimal flow the procedure may be terminated by the operator.

The proximity sensor 36 of the fresh fluid portion 32 is illustrated in its disengaged position, while the proximity sensor 40 of the used fluid portion 34 is illustrated in its engaged position. As described hereinafter, the proximity sensors 32, 34 are mechanically actuated sensors which respond to move under forces of the diaphragm 18. Other proximity sensors 32, 34 are envisioned, and may be appreciated by those skilled in the art. Such alternative proximity sensors 32, 34 may include electronic sensors, such as Hall-Effect sensors, or optical sensors which respond to the physical presence of the diaphragm 18 near the sensor, though which may not necessarily rely on a physical contact with the diaphragm to operate.

Bypass control assembly 19 supports an output flow of fresh fluid via conduit 58 from the fresh fluid portion 32 of the receptacle 12 during the operational mode. Fresh fluid is conducted through the bypass control assembly 19, through an outlet port 60 and delivered via conduit 58 to a pair of fresh fluid inlet ports 78, 80 of the flow alignment device 24. Check valves 66, 68 are coupled within the conduit 58 to limit the direction of fluid flow within conduit 58. Additionally, bypass control assembly 19 outlet port 60 may be is coupled to the external pump assembly 20 via conduit 70 and quick connect coupler 72. The pump 20, in turn, may be fluidly coupled to the fresh fluid storage receiver 22. A control valve 62 may be operatively coupled to the pump assembly 20 to direct fresh fluid into the fresh fluid reservoir 32.

Another feature of the present invention is the provision of an external pump 85 which may be used to provide boost to the augment the flow rate of the fluid into and out of the exchange device to increase the overall rate of the exchange procedure. For certain low flow transmissions, the operator may interconnect the boost pump 85 in series configuration with the flow alignment conduit 84 connected to the return side of the cooling circuit. The boost pump 85 can include a variable bypass valve between its inlet port and outlet port, allowing the operator to adjust the boost pump outlet pressure to be no greater than the total resistance provided downstream from the transmission pump's outlet port, including its cooling circuit and exchange system friction losses connected to the cooling circuit. This may assure that the internal pump of internal pump of the transmission can meet the delivery needs of the instant invention when augmented boost is provided by the pump 85, thereby minimizing stress to the internal pump of the transmission, and also assuring proper and continued operation of the alignment structure 24.

The flow alignment structure 24 includes a valve body 74 and an interiorly received valve 76 which is slidably movable within the valve body 74 in response to pressure differential therein. Valve body 74 further includes a pair of opposed fluid ports 78, 80 which are separately coupled via respective conduits 82, 84 to the transmission circuit. Fluid access to the transmission cooling is thus obtained via conduits 82 and 84. The flow alignment structure 19 also includes spring element 86. A sealing structure (not shown) may be intermediate the interface between the valve 76 and valve body 74. Alternatively, tolerances between the valve 76 and valve body 74 may be minimized to limit the amount of fluid losses across the interface and between the ports 54, 62, 64, 78, 80 of the device.

Figure 4:
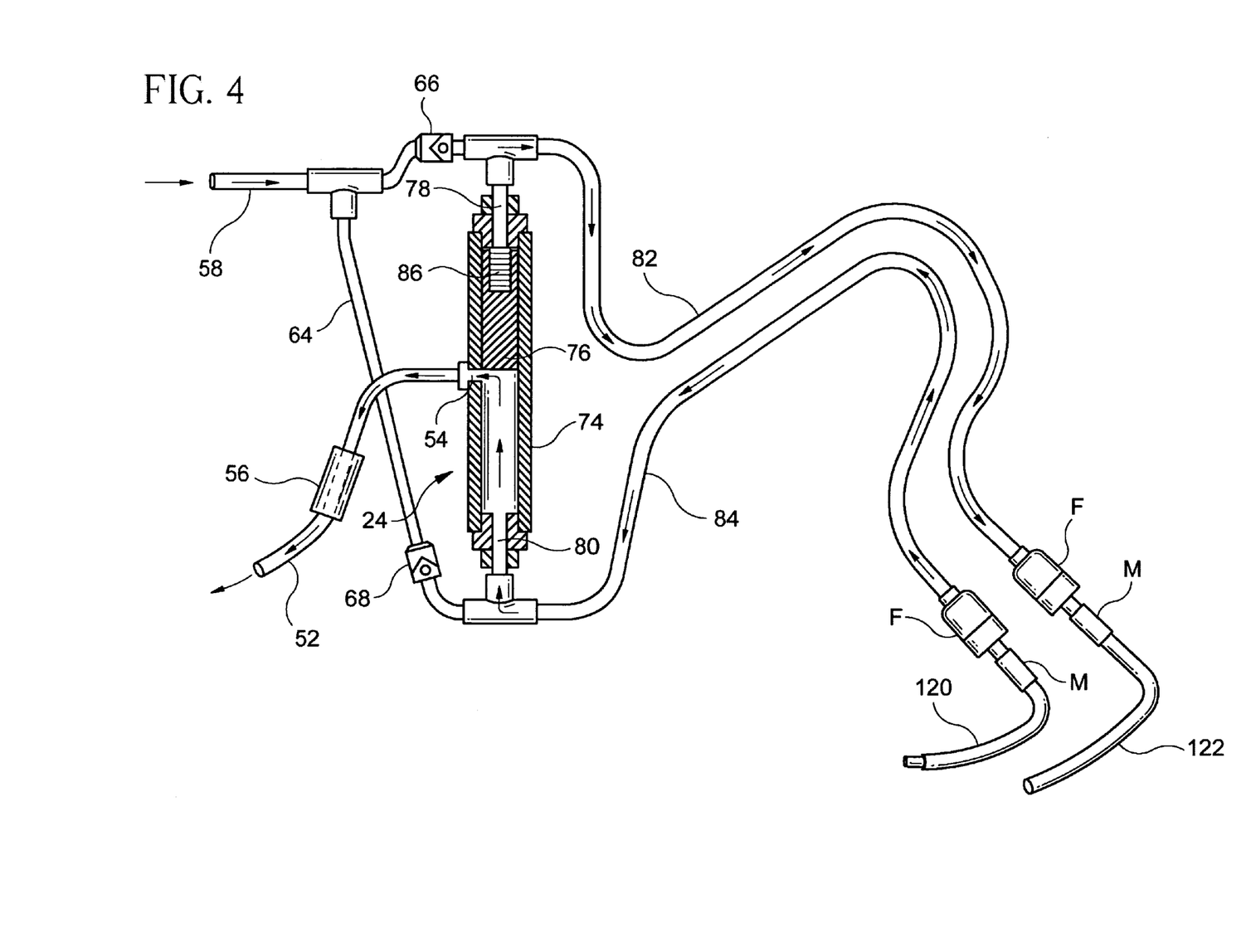
FIG. 4 is a schematic diagram of a portion of the fluid exchange system of FIG. 1, specifically illustrated operation of the flow alignment assembly.

Used fluid from the accessed transmission circuit is directed through the flow alignment structure (via outlet 54) to the used fluid reservoir 34. Used fluid passes through the valve body 74 as directed by the valve 76. As illustrated in FIG. 1, the valve 76 is disposed near the lower portion of the valve body 74 as biased by the used fluid pressure introduced via port 78 from the transmission circuit. Used fluid is prevented from passing through outlet port 80 by the valve 76. Fresh fluid from the fresh fluid reservoir 32 passes through conduit 64, through check valve 68, and into conduit 84 before entering the accessed transmission circuit. Desirably, fresh fluid is prevented from mixing used fluid within the flow alignment structure 24. In comparison, FIG. 4 illustrated the exchange apparatus coupled to an accessed transmission circuit presenting an opposite flow. The valve 76 is disposed proximate the upper portion of the valve body 74 as biased by the used fluid pressure introduced via port 80 from the transmission circuit. The spring element 86 is compressed between the valve 76 and the valve body 74. Fresh fluid from the fresh fluid reservoir passes through conduit 58 and check valve 66 and into conduit 82 prior to being introduced into the accessed transmission circuit. In this situation, fresh fluid does not pass through conduit 64 as check valve 68 prevents flow thereacross.

Operation of a Preferred Embodiment

Operation of the exchange system may be described with reference to FIGS. 1–4. FIG. 1 illustrates the exchange system 10 as interconnected to the cooling circuit of a transmission through accessed cooling conduits 120 and 122. As an aside, the full fresh fluid condition of the exchange system as illustrated in FIG. 1 has been achieved by coupling the external pump 20 to the to fresh fluid supply reservoir 22 to force fresh fluid into the fresh fluid portion 32 of the receptacle 12. As fresh fluid is introduced by the pump 20 through port 60 of the bypass assembly 19, through the interior of the bypass slide valve 90 and into the fresh fluid portion 32 of the receptacle 12, used fluid is forced out of the receptacle 12 and into a previously coupled used fluid reservoir 50. Proximity sensor 40 is triggered by the diaphragm 18 and a proximity control circuit 140 may indicate to the user the fresh fluid full condition to the operator through a visual indicator, such as a LED 144, and/or through generation of an audible warning tone. Prior to normal operation, pump 20 is removed from the exchange system 12. Alternatively, filling of fresh fluid may be accomplished via a pressurized fluid delivery line(not shown), such as typically found in service stations.

Fluid direction through the flow alignment conduits 82 and 84 is established by the flow within the accessed transmission cooling circuit. As appreciated by those skilled in the art, the flow alignment conduits 82, 84 may be randomly intercoupled to the cooling circuit 120, 122 of the transmission without regard to particular specific internal transmission flow directions. Fluid flow in the exchange system 10 is indicated by arrows within fluid conduits. Referring to FIG. 1, used fluid flows from the transmission cooling circuit through conduit 82 and enters the flow alignment structure 24 at port 78. In comparison, referring to FIG. 4, used fluid flows from the transmission cooling circuit through conduit 84 and enters the flow alignment structure 24 at port 80. Again referring to FIG. 1, valve 76 of flow alignment structure 24 is displaced under used fluid pressure (and/or by the spring force) which results in a fluid coupling between port 78 and port 54. Used fluid thus flows through conduit 52 and enters the used fluid portion 34 of the receptacle 12. As described hereinafter, used fluid during the exchange mode of operation is restricted from flowing through conduit 42 by operation of the bypass assembly 19.

The fluid exchange procedure continues, as illustrated in FIG. 2, with the used fluid flow resulting in a corresponding fresh fluid outflow from the receptacle 12. Fluid flow through bypass conduit 42 is restricted during the exchange mode by operation of the bypass control assembly. More specifically, inlet port 94 is not aligned with port 106 of the bypass slide valve 90, but is blocked by the valve 90.

The fluid exchange procedure continues, as illustrated in FIG. 3, until the fresh fluid portion 26 of the fluid receptacle 26 is depleted. Diaphragm 18 is fully distended and adjacent the upper wall 14 of the receptacle 26. Bypass control assembly 19 is actuated by the distended diaphragm 18 to couple fluid conduit 42 to fluid conduit 58. In this manner, the fluid exchange receptacle is removed from the assembly and fluid expelled from vehicle conduit 122 is routed through the assembly and returned through fluid conduit 120. Fluid passes through bypass assembly 19 by passing through port 94, through aligned port 106 and out port 60 of the bypass assembly 19.

The fluid exchange procedure may be repeated by draining the used fluid from the used fluid reservoir 34 into a used fluid receptacle 50 and introducing fresh fluid from a fresh fluid receptacle 22 into the fresh fluid reservoir 32. During the refill process, the valve assembly 62 is activated to prevent pressurized fresh fluid from being directly discharged away from the fresh fluid reservoir 32.

While the alignment structure 24 of the present invention has been described with reference to a particular diaphragm-based fresh fluid and used fluid system, alternative embodiments may also be practicable. For instance, the alignment structure 24 may find applicability with other exchange devices, such as those disclosed in U.S. Pat. Nos. 5,370,160 to Parker, and 5,522,474 to Burman.

Figure 5:
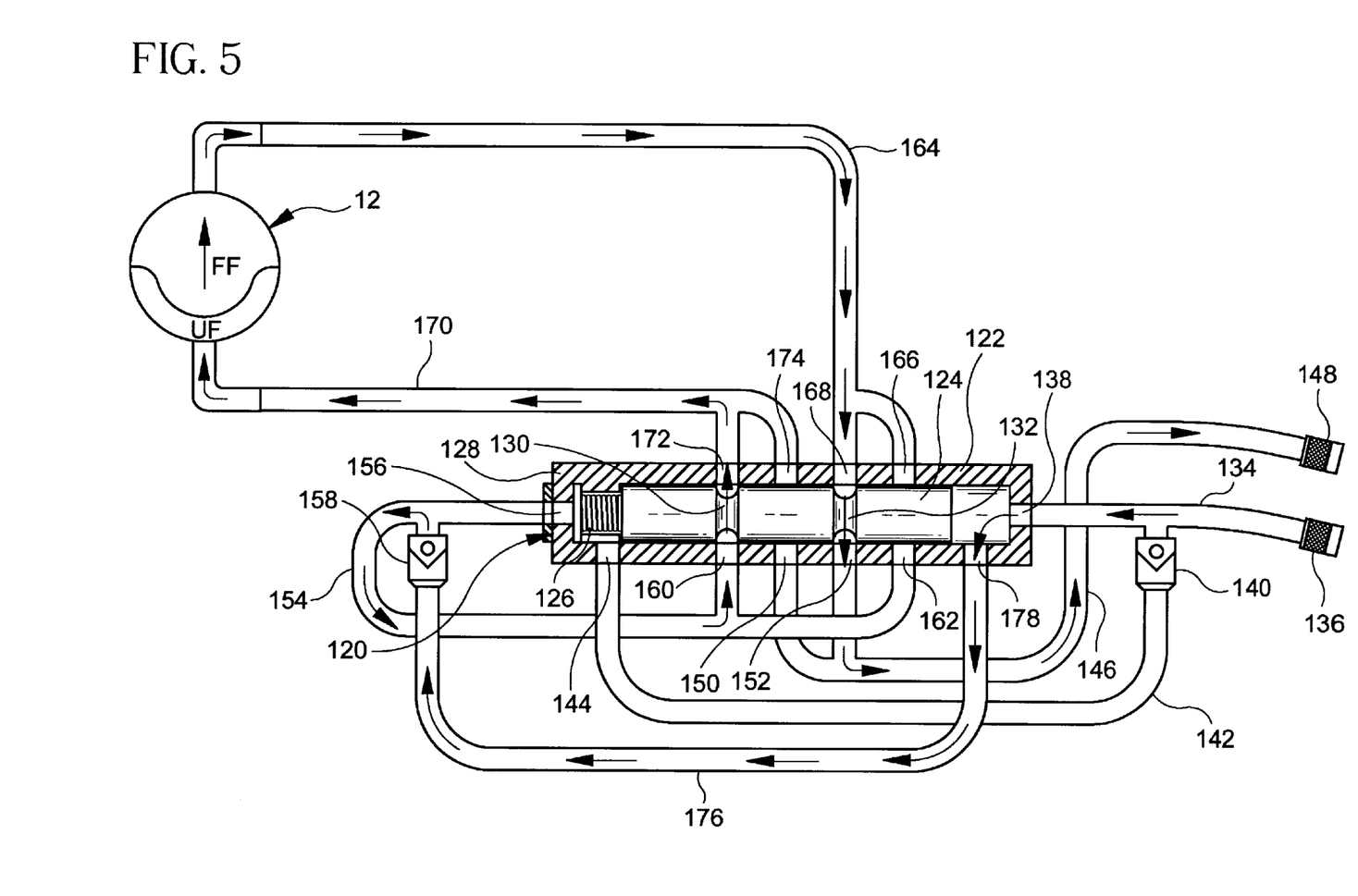
FIG. 5 is a schematic diagram of a fluid exchange system including an alternative embodiment of a flow alignment structure.

FIG. 5 schematically represents another embodiment of an alignment structure 120 according to the present invention. It has been determined by the applicant that this particular alignment structure 120 is boost (pressure) insensitive. If a boost insensitive automatic alignment valve is utilized, an auxiliary pump can be used to provide boost to the fluid flow of the unit between the automatic alignment valve 120 and the single cylinder pressure tank assembly 12 at either the used fluid inlet side or the fresh fluid outlet side, rather than between the transmission and the alignment valve structure 120. Providing boost at these locations provides distinct advantages. First, the operator does not have to start and then stop the exchange process to determine which line to the transmission's cooling circuit is the higher pressure line (by sensing the warmest line). Secondly, the location at which boost is provided can be at a fixed position inside the unit between the automatic alignment valve 120 and the single cylinder pressure tank assembly 12 without having to construct the unit to accept boost alternatively at either conduit connected to the transmission's cooling circuit. Thirdly, use of this boost insensitive automatic alignment valve 120 allows use of a pressure differential switch connected to both conduits 142,146 which are connected to the cooling circuit of the transmission. This pressure differential switch can then be used in combination with a microprocessor with suitable software instructions available and this microprocessor can be connected to a variable output pump assembly characterized by either variable speed DC capability, or constant volume delivery with a variable bypass relief system for variable output capability, or by multiple pumps operated singly or multiply to provide variable total output, with either of which is connected to and then controlled by the microprocessor in response o the signals provided by the pressure differential switch.

Alternatively, electronically indicating flow meters can be substituted for the pressure differential switch as long as at least one each is connected to both conduits which are connected to the transmission's cooling circuit. Alternatively, such sensing devices can be connected to both sides of the single cylinder pressure tank assembly at any location between that assembly and the transmission's cooling circuit to provide signals for a microprocessor controller. In addition, a smaller, simpler boost system can be utilized to provide boost to either side of the fluid flow of the unit. This would consist of use of a pressure differential switch or sensing system connected to both conduits connected to the transmission's cooling circuit and this switch in turn connected to start the boost pump system when activated. It is necessary for this boost pump to operate at one volume of delivery only with the volume selected typically much lower than a microprocessor operated boost system could utilize without applying more low pressure to the transmission pump than it can match with its output.

Referring particularly to FIG. 5, an automatic alignment valve assembly 120 is comprised of a valve body 122, valve slide 124, and a coil return spring 126. A threaded valve end 128 is threadedly secured into valve body 122 at port 130 to interiorly retain valve slide 124. Coil return spring 126 is inserted into a recessed end bore of slide 124. Slide 124 has a vent channel 130 toward the spring end and another vent channel 132 at the opposite end. Main input/output hose assembly 134 is connected at one end to a quick connect female coupling 136 and at the other end to a spent fluid inlet port 138 and to a checkvalve 140. Checkvalve 140 is in turn connected to a fresh fluid supply conduit 142 which is connected to a fresh fluid outlet port 144. Main input/output hose assembly 146 is connected at one end to a quick connect female coupling 148 and at the other ends to a spent fluid inlet port 150 and a fresh fluid outlet port 152. A generic conduit 154 (which can carry either fresh or spent fluid depending on the position of valve slide 124) is connected at a fresh fluid inlet port 156, at a checkvalve 158, at a spent fluid inlet port 160, and at a fresh fluid outlet port 162. A fresh fluid supply conduit 164 is connected to communicate with the fresh fluid side of the exchange device 12 and to a fresh fluid supply port 166 and a fresh fluid supply port 168. A spent fluid delivery conduit 170 is connected to the spent fluid side of the exchange device 12 and at the other end to a spent fluid outlet port 172 and a spent fluid outlet port 174. A spent fluid conduit 176 is connected at one end to spent fluid outlet port 178 and to a checkvalve 158 at its other end. All hoses may be made of an ATF resistant material and are fastened to each other and to valve body 122 by use of means common and well known in the art such as hose barbs, hose clamps, and ferrules. Valve assembly 120 can be made of a number of suitable metals, metal alloys or plastic composites such as steel, brass, aluminum, or Lexan®, which have the necessary suitable stability, rigidity, pressure bearing strength, temperature resistance for handling ATF at the temperatures it will be exchanged at.

Hoses 146 and 134 are suitably connected to a pair of special adapters, one each, the first connection by random selection and the second by default, after each adapter has been connected to one side each of an opened, split cooling circuit of an automatic transmission. If the fluid outlet side of the cooling circuit is connected to communicate pressurized used fluid with valve 120 through hose 134 as shown in FIG. 5, then valve slide 124 will be operated to its activated position flush against the spring side of the valve body 122. The valve slide 124 will thereby compressing spring 126 as shown in FIG. 5. If connected in opposite configuration slide valve 124 will transition to its default position with spring 126 fully extended. With valve 124 orientated as shown in FIG. 5, the result is spent fluid being pumped out of the transmission under power of the transmission's internal pump through coupling 136 into hose 134, blocked at checkvalve 140, into port 138, through valve body 122 and out of port 178 to conduit 176, through checkvalve 158, to and through conduit 154 to and through port 160, across vent channel 130 to and through port 172 to conduit 170 and into the spent fluid side of the tank assembly 12 to thereby displace fresh fluid and pump it out of tank 12 to the return line side of the opened split cooling circuit through conduit 164. Conduit 164 delivers the fresh fluid to port 168 and across slide 124 at vent channel 132 to and through port 152, to and through hose 146 and through coupling 148 to the return line side of the transmission's cooling circuit.

With the configuration of couplings 136 and 148 connected to communicate with the opened, split cooling circuit of the transmission being reversed, valve 120 operates with its slide 124 in the opposite position with spring 130 fully extended and the following ports connected to communicate with each other: port 150 to port 174 through channel 130, and port 162 with port 166 through channel 132. This results in used fluid from the transmission being pumped into hose 146 to and through port 150, through channel 130 to and through port 124 to conduit 170 and into the used side of the tank 2. This then causes fresh fluid to be pumped out of tank assembly 12 through hose 164 to and through port 166, to and through channel 132, to and through port 162, to and through conduit 154, blocked at checkvalve 158, to and through port 156, to and through valve body 122, to and through port 144, to and through hose 142, to and through checkvalve 140 and into and through hose 134 to flow through coupling 136 to the return line side of the opened, split cooling circuit of the automatic transmission. Automatic alignment valve assembly 120 can easily be used with a closed system single cylinder displacement type fluid exchanger. It can also be easily used with the type of split system, balanced fluid exchanger depicted in the Viken U.S. Pat. No. 5,472,064 wherein a fresh fluid introduction system is flow balanced to a spent fluid discharge system.

Additionally, it may be appreciated that the present invention may find further applicability to fluid exchange devices outside of the automotive or transportation industries. For example, the alignment structure may be readily adapted for use in industrial fluid exchange systems or devices. Other advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

I claim:

1. A fluid exchange device for exchanging used fluid in a hydraulic system with fresh fluid, said hydraulic system accessed to define a pumping conduit and a return conduit, said fluid exchange device comprising:

an inlet conduit for receiving used fluid from the pumping conduit and an outlet conduit for supplying fresh fluid to the return conduit;

a valve body having at least a pair of inlet ports and an outlet port, said outlet port coupled to the inlet conduit of the fluid exchange device; and a valve interiorly received within said valve body, said valve capable of moving within the valve body between a first position and second position;

whereas when a first one of said at least a pair of inlet ports is in fluid communication with the pumping conduit, and the other one of said at least a pair of inlet ports is in fluid communication with the return conduit, the valve is in said first position and said valve body outlet port is fluidly coupled to the first one of said at least a pair of inlet ports; and whereas when the first one of said at least a pair of inlet ports is in fluid communication with the return conduit, and the other one of at least a pair of inlet ports is in fluid communication with the pumping conduit, the valve is in said second position and said valve body outlet port is fluidly coupled to the other one of said at least a pair of inlet ports.

2. A fluid exchange device according to claim 1, further comprising:

a spring element disposed within the valve body and capable of biasing the valve, said spring being disposed between the valve and the first one of said at least a pair of inlet ports.

3. A fluid exchange device according to claim 1, wherein the first one and other one of said at least a pair of inlet ports are operatively coupled to the outlet conduit of the fluid exchange device through a pair of check valve assemblies.

4. A fluid exchange device according to claim 1, wherein the fluid exchange device is a fluid receptacle having a separation member therein, said separation member being movable to define a fresh fluid portion of the fluid receptacle and a used fluid portion of the fluid receptacle.

5. A fluid exchange device according to claim 1, further comprising:

a pump assembly operatively coupled to the fluid exchange device for supplying a pressurized fresh fluid to the accessed hydraulic system.

6. A fluid exchange device according to claim 1, wherein the valve body includes a single interiorly received valve therein.

7. A fluid exchange device for exchanging used fluid in a hydraulic system with fresh fluid, said hydraulic system accessed to define a pumping conduit and a return conduit, said fluid exchange device comprising:

an inlet conduit for receiving used fluid from the pumping conduit of the hydraulic system;

an outlet conduit for supplying fresh fluid to the return conduit of the hydraulic system;

a valve body having a first and second inlet port and an outlet port, said outlet port coupled to the inlet conduit of the fluid exchange device; and a valve interiorly received within said valve body, said valve capable of moving within the valve body between a first position and second position;

whereas when a first inlet port is in fluid communication with the pumping conduit, and the second inlet port is in fluid communication with the return conduit, the valve is in said first position and said valve body outlet port is fluidly coupled to the first inlet port to receive used fluid from the hydraulic system; and whereas when the first inlet port is in fluid communication with the return conduit, and the second inlet port is in fluid communication with the pumping conduit, the valve is in said second position and said valve body outlet port is fluidly coupled to the second inlet port to receive used fluid from the hydraulic system.

8. A fluid exchange device according to claim 7, further comprising:

a spring element disposed within the valve body and capable of biasing the valve, said spring being disposed between the valve and the first inlet port.

9. A fluid exchange device according to claim 7, wherein the first and second inlet ports are operatively coupled to the outlet port of the fluid exchange device through a pair of check valve assemblies.

10. A fluid exchange device according to claim 7, wherein the fluid exchange device is a fluid receptacle having a separation member therein, said separation member being movable to define a fresh fluid portion of the fluid receptacle and a used fluid portion of the fluid receptacle.

11. A fluid exchange device according to claim 7, further comprising:

a pump assembly operatively coupled to the fluid exchange device for supplying a pressurized fresh fluid to the accessed hydraulic system.

12. A fluid exchange device according to claim 7, wherein the valve body includes a single interiorly received valve therein.

13. A method of exchanging used hydraulic fluid with fresh hydraulic fluid in a hydraulic system having an internal pump and an external fluid cooling circuit, said method comprising the steps of:

providing a fluid receptacle having a first end and a second end and a movable fluid separation member therebetween, said separation member defining a used fluid portion and a fresh fluid portion within the receptacle;

coupling the used fluid portion of the receptacle to the hydraulic system;

coupling the fresh fluid portion of the receptacle to the hydraulic system;

providing an alignment valve structure between the receptacle and the hydraulic system, said alignment valve structure having a first inlet port and an opposed second inlet port, and said alignment valve structure having a valve body receiving a movable valve therewithin; and allowing the valve to move within the valve body as used hydraulic fluid flows from the hydraulic system to the used fluid portion of the receptacle, said valve permitting used fluid from the hydraulic system to flow through either the first inlet port or the opposed second inlet port.

14. A method of exchanging used hydraulic fluid with fresh hydraulic fluid in a hydraulic system according to claim 13, wherein the valve moves toward the opposite inlet port.

15. A method of exchanging used hydraulic fluid with fresh hydraulic fluid in a hydraulic system according to claim 13, wherein the alignment valve structure further includes a spring element disposed between the valve and the valve body.

16. A fluid exchange device for exchanging used fluid in a hydraulic system with fresh fluid, said hydraulic system accessed to define a pumping conduit and a return conduit, said fluid exchange device comprising:

an inlet conduit for receiving used fluid from the hydraulic system;

an outlet port for supplying fresh fluid from the hydraulic system;

a valve body having a first and second inlet port and an outlet port, said outlet port coupled to the inlet conduit of the fluid exchange device; and a valve interiorly received within said valve body, said valve capable of moving within the valve body between a first position and second position;

whereas when a first inlet port is in fluid communication with the pumping conduit, and the second inlet port is in fluid communication with the return conduit, the valve is biased into said first position and said valve body outlet port is fluidly coupled to the first inlet port to receive used fluid from the hydraulic system; and whereas when the first inlet port is in fluid communication with the return conduit, and the second inlet port is in fluid communication with the pumping conduit, the valve is biased into said second position and said valve body outlet port is fluidly coupled to the second inlet port to receive used fluid from the hydraulic system.

17. A fluid exchange device according to claim 16, further comprising:

a spring element disposed within the valve body and capable of biasing the valve, said spring being disposed between the valve and the first inlet port.

18. A fluid exchange device according to claim 16, wherein the first and second inlet ports are operatively coupled to the outlet conduit of the fluid exchange device through a pair of check valve assemblies.

19. A fluid exchange device according to claim 16, wherein the fluid exchange device is a fluid receptacle having a separation member therein, said separation member being movable to define a fresh fluid portion of the fluid receptacle and a used fluid portion of the fluid receptacle.

20. A fluid exchange device according to claim 16, further comprising:

a pump assembly operatively coupled to the hydraulic system for supplying a pressurized fresh fluid to the accessed hydraulic system.

* * * * *